Feb. 17, 1948.  S. A. HALL  2,436,004
SAW TREATING AND GRINDING MACHINE
Filed Oct. 19, 1945  2 Sheets-Sheet 1
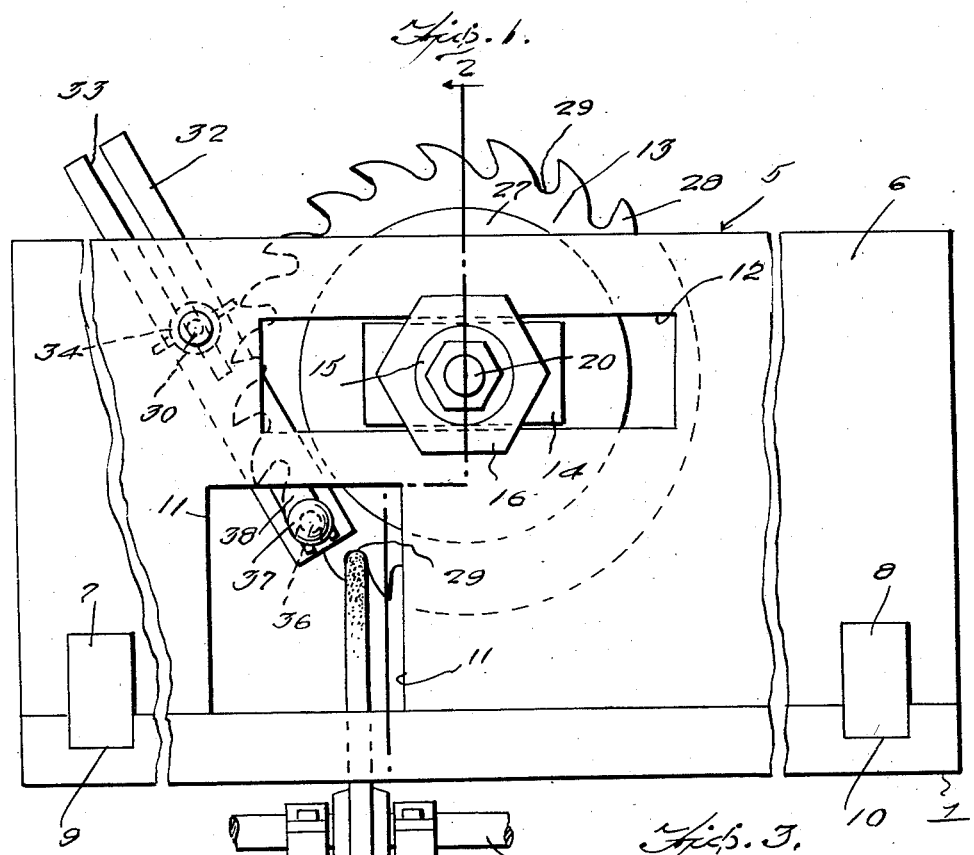
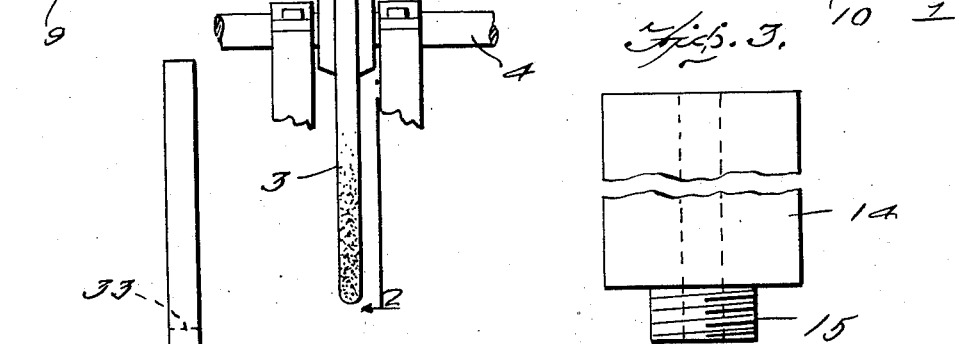
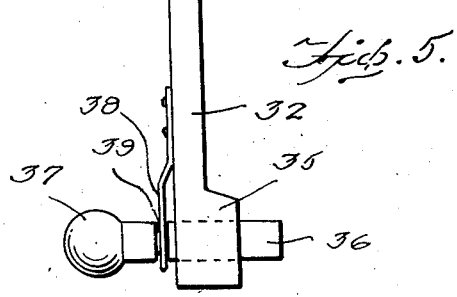
Inventor
Samuel A. Hall
Attorneys Feb. 17, 1948. S. A. HALL 2,436,004
SAW TREATING AND GRINDING MACHINE
Filed Oct. 19, 1945 2 Sheets-Sheet 2
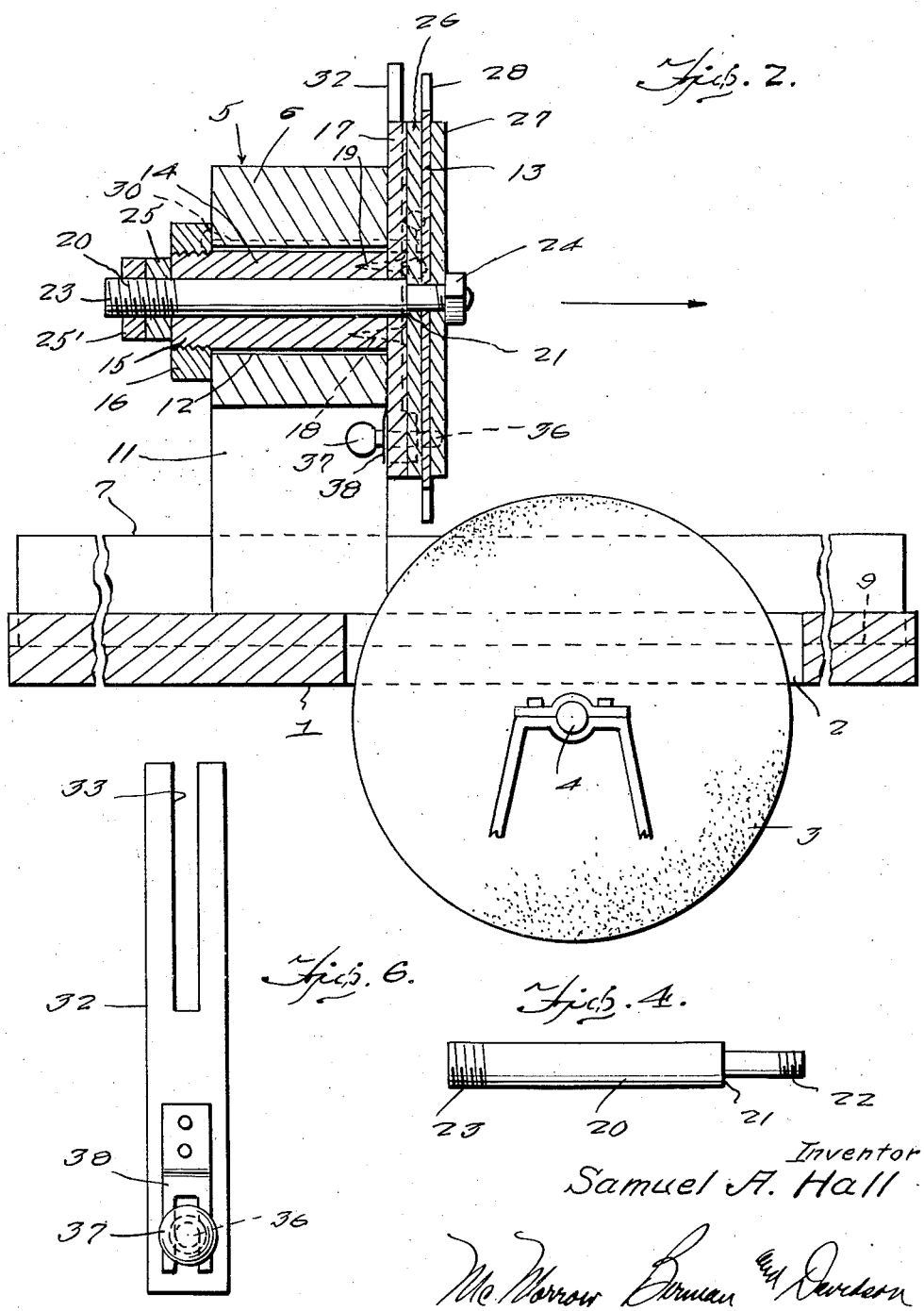
Inventor
Samuel A. Hall Patented Feb. 17, 1948

2,436,004

UNITED STATES PATENT OFFICE 2,436,004

SAW TREATING AND GRINDING MACHINE

Samuel A. Hall, North Canton, Ohio

Application October 19, 1945, Serial No. 623,358

3 Claims. (Cl. 76—43)

This invention relates to improvements in saw treating and grinding machines, more particularly to circular saw treating and sharpening machines.

It is an object of my invention to provide a mounting unit for a circular saw whereby it may be supported on an adjustable table for sliding movement thereon.

It is an object of my invention to provide an adjustable table having a slot to receive a grinding wheel which projects through the table and its slot.

It is an object of my invention to provide a saw supporting unit in which the saw may be adjusted arcuately step by step to treat each succeeding tooth and gullet of the saw by the grinding wheel.

Other objects and advantages will be revealed in connection with a detailed description of the accompanying drawings which form a part of this specification.

In the drawings:

Figure 1 is an elevational view of the machine viewing it from one end of the table.

Figure 2 is a centrally located longitudinal, vertical sectional view taken on the line 2—2 of Figure 1 looking in the direction of the arrows.

Figure 3 is an elevational view on an enlarged scale, of the shaft supporting bushing for the same.

Figure 4 is an elevational view of the saw clamping and supporting shaft.

Figure 5 is an edge elevational view of an angularly and longitudinally adjustable arm to maintain the saw in the desired arcuate position of adjustment, and Figure 6 is a front elevational view of the same.

The drawing is merely illustrative of my invention and not definitive thereof except as specified in the subject matter claimed.

The reference characters identify the particular details of my invention as herein pointed out.

In the drawings the table top 1 is adjustable vertically by means (not shown) and is provided with a longitudinal slot to receive the upper portion of a grinding or treating wheel 3. The wheel 3 is fixedly mounted on a shaft 4 located below the table top 1. The shaft 4 is mounted in bearings supported by brackets or the like beneath the table top. The table top 1 is provided with means (not shown) whereby the table top may be elevated or depressed to expose more or less of the grinding wheel 3 above the table top. The shaft 4 has its axis relatively in a fixed location.

The saw supporting unit 5 is slidably located upon the table top 1 and comprises an upright substanially rectangular body 6 of considerable thickness to provide substantial area for fixedly securing guide rails 7, 8 thereto. The rails 7, 8 are arranged parallel to each other and transversely of said unit 5. The table top is provided with channels or grooves 9, 10 to receive and guide the rails 7 and 8.

The body 6 is provided with a vertical slot 11 to accommodate the grinding wheel as the unit 5 slides to and fro over it. The body 6 is also provided with a horizontal slot 12 whereby the saw 13 and its mountings may be adjusted longitudinally of the body 6 and transversely of the table top 1.

The mountings for the saw 13 include a bushing 14 having a thickness substantially equal to the width of the slot 12. The bushing 14 is provided with screw threads 15 to receive the nut 16 on one end thereof. A plate 17 is secured to the opposite end of the bushing 14 by screws 18, 19 having their heads countersunk into the plate. The bushing 14 receives a supporting shaft 20 having one reduced end portion providing a shoulder 21. The opposite ends of the shaft are provided with screw threads 22 and 23 to receive respectively the nuts 24 and 25. The reduced end portion of the shaft 22 passes through the center of the saw and its supporting disks 26 and 27. The disks are clamped between the shoulder 21 and the nut 24 to firmly hold the saw. The shaft 20 is provided with a lock nut 25' to cooperate with the nut 25 since the saw and its supporting shaft 20 must provide for the step by step adjustment of the saw and its teeth 28 and the intervening gullets 29.

The body 6 is provided with an adjustable arm 32 which is provided with a long longitudinal slot 33 whereby it may be secured to the rear outside of the body 6 by a bolt 30. The bolt is provided with a winged nut 34 whereby the arm may be readily adjusted. The lower end portion of the arm is provided with a boss 35 which extends inwardly through the notch 11 to engage the saw lightly. The lower end of the arm and its boss are apertured to receive a slidable detent 36 having a knob 37 on its outermost exposed end. The detent is actuated toward the saw and into the gullets thereof by a slotted leaf spring 38. An annular groove 39 in the detent receives the slotted end of the leaf spring and the opposite end of the spring is secured to the arm by suitable fastenings such as nails, screws, rivets, bolts, etc.

The rails 7 and 8 projecting from opposite sides of the unit 5 and above the surface of the table top 1 may serve as handles to reciprocate the unit to and fro over the rotating wheel 3. Of course additional means (not shown) may be provided to serve as handles for reciprocating the unit.

The disks 26 and 27 are considerably smaller than the saw to provide ample space between the gullets 29 and the edges of the disks.

In the operation of the device when substituting one saw for another the nut 24 is removed from the shaft 20. The outer disk 27 and the saw is removed from the shaft and then another saw and the disk are placed on shaft 20 whereupon the nut 24 is replaced. The disk 26 is in frictional contact with the plate 17 to provide for arcuate or angular adjustment of the saw. In order to maintain the adjustment for the proper amount of friction the shaft 20 is provided with a lock nut 25' to cooperate with the nut 25.

Now the saw must be properly adjusted to the grinding wheel 3. This is done by bringing one of the gullets 29 over the highest spot on the wheel and if adjustment transversely of the wheel and table top is required the nut 16 is loosened and the proper transverse adjustment is made and then the nut 16 is tightened to maintain such adjustment. If the wheel does not enter deeply enough into the gullet then the table top is lowered to a proper adjustment by means (not shown). On the other hand if the saw is too low the table may be raised accordingly. When both adjustments of the saw are made then the arm 32 and its detent 36 are adjusted to fit into the next gullet clockwise of the one over the grinding wheel and secured in position.

After the grinding of the first gullet and its tooth 28 the arm 32 and its detent are readjusted to the newly ground gullet which should be a final adjustment for that particular saw, which will insure that all of the gullets are ground to an equal depth.

The unit 5 is shifted to and fro over the rotating grinding wheel by man power, preferably one man on each side of the table. Each man may grasp one of the rails and operating in unison propel the unit back and forth over the wheel.

When one saw is finished it is removed from the unit and the machine is now ready to receive another saw for adjustment and treatment.

Having fully shown and described my invention, what I claim is:

1. In a saw treating machine the sub-combination comprising a saw supporting unit for circular saws, means in said unit supporting said saw for both angular and bodily adjustment, in combination with an arm mounted on the outside of said unit in engagement with said saw, said arm having a slot receiving a bolt, said bolt having a nut whereby said arm may be secured in adjusted position, said arm having a boss on one of its ends and extending laterally therefrom and toward said saw, said arm and its boss being apertured and slidably receiving a detent, said detent being actuated toward the saw by a leaf spring secured to said arm, said detent having a knob whereby it may be withdrawn from engagement with the saw.

2. In a saw-grinding machine, a vertically adjustable table, a slot in said table, a rotatable grinding disk journaled below said table and projecting upwardly through the slot therein, a saw support mounted for slidable movement along said table chordally of said grinding disk, a vertically disposed slot in said saw support providing clearance for said grinding disk, a horizontally disposed slot in said saw support, a bushing and shaft adapted to support a saw in engagement with said grinding disk positioned in said horizontally disposed slot for movement transversely of the grinding disk, and a work-indexing lever pivotally mounted on said saw support, said work-indexing lever having a spring-biased plunger in its outer end adapted to be positioned in a tooth of a saw mounted by said bushing and shaft arcuately spaced from the tooth being ground.

3. In a saw-treating machine, the combination with a slotted table top having a rotatable grinding wheel extending partly through the top thereof, of a unit adapted to support a saw to be treated and mounted for reciprocal movement with respect to said wheel, said unit including an upstanding body portion having a horizontally-disposed slot extending transversely therethrough, a hollow tubular bushing slidably mounted within said slot, a plate on an end of said bushing and carried thereby, a shaft extending through said bushing and said plate and adjustably mounted in said bushing, a first disk loosely mounted on said shaft and arranged in abutting relation with respect to said plate, a second disk loosely mounted on said shaft and arranged to hold a saw in abutting relation with respect to said disk, means on the end of said shaft adjacent said second-named disk for fixedly locking said disks in assembled relation, and indexing means mounted on the outside of said unit, said indexing means including an arm having a boss on its outer end, and a withdrawable detent slidably mounted in said boss and actuable in one direction to successively engage the gullets of the saw when supported on said unit.

SAMUEL A. HALL.

REFERENCES CITED

The following references are of record in the file of this patent:

UNITED STATES PATENTS

| Number | Name | Date |
|---|---|---|
| 46,951 | Sparks | Mar. 21, 1865 |
| 385,693 | Blackmer | July 10, 1888 |
| 2,130,965 | Porter | Sep. 20, 1938 |
| 1,669,941 | Kennedy | May 15, 1928 |
| 1,938,548 | Tautz | Dec. 5, 1933 |
| 2,075,282 | Hedgpeth | Mar. 30, 1937 |
| 1,719,601 | Eisenberg | July 2, 1929 |
| 204,402 | Watson | May 28, 1878 |
| 264,021 | Agan | Sept. 5, 1882 |
| 1,135,245 | Zuleg | Apr. 13, 1915 |
| 2,293,231 | Weiland | Aug. 18, 1942 |
| 614,247 | Goodhew et al. | Nov. 15, 1898 |
| 727,981 | Lomasney | May 12, 1903 |
| 1,198,253 | Medhurst | Sept. 12, 1916 |
| 1,230,111 | Callaway | June 19, 1917 |
| 1,295,156 | Gorham | Feb. 25, 1919 |